United States Patent [19]
Ackerman

[11] Patent Number: 5,590,851
[45] Date of Patent: Jan. 7, 1997

[54] LUGGAGE BINS FOR THE CABINS OF PASSENGER AIRCRAFT

[75] Inventor: David Ackerman, Pulham, United Kingdom

[73] Assignee: Bridport-Gundry PLC, Bridport, England

[21] Appl. No.: 380,585

[22] Filed: Jan. 30, 1995

[30] Foreign Application Priority Data

Feb. 1, 1994 [GB] United Kingdom ............... 9401919

[51] Int. Cl.$^6$ ............................................. B64D 47/00
[52] U.S. Cl. ................................ 244/118.1; 244/118.5; 220/264; 74/98
[58] Field of Search ............................ 244/118.1, 118.2, 244/118.5, 129.1, 119; 74/98; 220/263, 264; 254/95, 97; 49/379, 386, 339, 340, 341, 342

[56] References Cited

U.S. PATENT DOCUMENTS 1,878,796  9/1932  Morse et al. .................. 49/340
5,383,628  11/1995  Harriehausen et al. .............. 244/118.1

FOREIGN PATENT DOCUMENTS 957458  1/1957  Germany ........................... 268/106

*Primary Examiner*—Andres Kashnikow
*Assistant Examiner*—Tien Dinh
*Attorney, Agent, or Firm*—Dennison, Meserole, Pollack & Scheiner

[57] ABSTRACT

In an overhead luggage bin for the passenger cabin of an aircraft, the bin has an opening with at least two hinged doors being provided at the bin opening. The bin includes at least one telescopically extensible spring strut device. In such a device a spring is resiliently loaded as the strut telescopically contracts. The spring strut device operates on two of the doors simultaneously through the medium of a differential mechanism. The thrust of the spring strut device tends to open the two doors simultaneously and the differential mechanism permits the two doors to be opened and closed, one relative to the other.

10 Claims, 6 Drawing Sheets

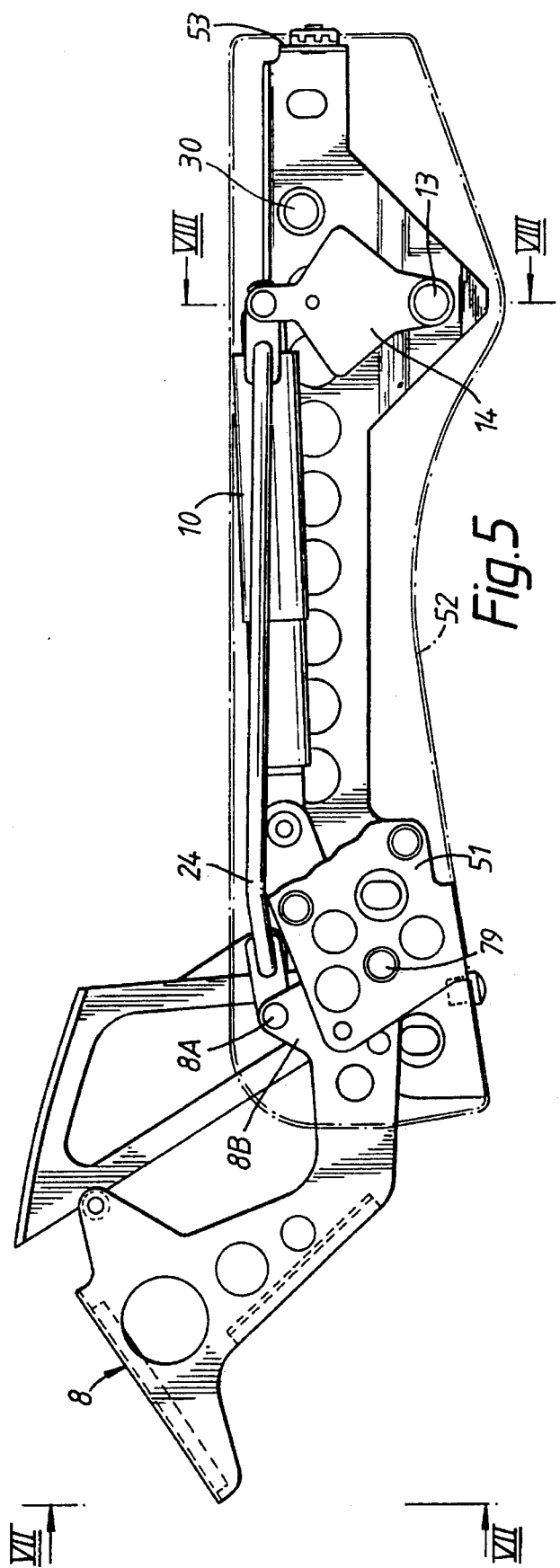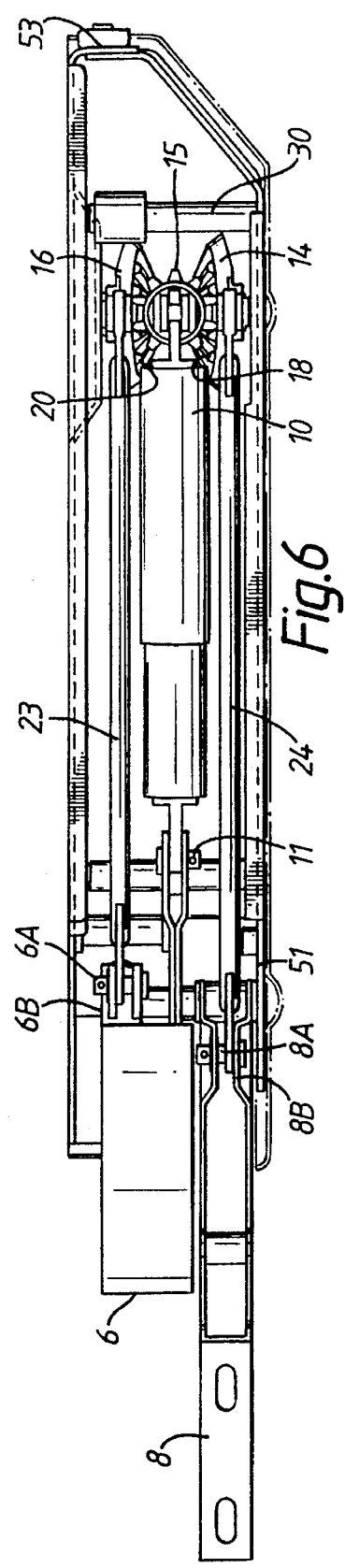

LUGGAGE BINS FOR THE CABINS OF PASSENGER AIRCRAFT

This invention relates to an overhead luggage bin in an aircraft passenger cabin.

Such luggage bins, provided with secondary visor doors are discussed in U.S. Pat. No. 5,035,471 and EP-A-O 348 130. Such bins have the shape and or effect of a closed box and behind a main front door panel which is hinged at a location adjacent its upper generally horizontal edge and which opens outwardly and upwardly, there is provided a second outwardly and upwardly opening secondary door means. Such secondary door means comprise two or more visor doors situated side by side to extend across the bin opening behind each main door thereof when closed. When the main door is open with the visor doors remaining closed, the visor doors mask at least the lower part of the bin opening over its full width, thereby to prevent articles stored in the bin from inadvertently falling out, at the risk of causing injury to persons nearby. Usually, the visor doors are transparent in order that articles lodged behind them may be seen.

In the system described in the aforementioned prior patent specifications, the main doors and the visor doors each have firstly, spring means which bias the doors to open and secondly, latch means engaging keep means on the fixed structure of the bin. While these latch means are preferably self latching as each door is closed, in order to open each door, whether it be an outer main door or an inner visor door, it is necessary to manipulate the particular latch means of that individual door, employing a deliberate hand or finger motion, before the latch means can be disengaged from lock keep means on the bin. The intention is that the doors should only be opened by a deliberate intention formed after it has been verified by looking through the visor doors that there is nothing lodged behind which is at risk of falling out.

An overhead luggage bin of the type heretofore proposed, and as described in the prior patent specifications mentioned at the outset, has an outer main door and behind this, two or more supplementary visor doors, and it is usual to provide biassing means for assisting the outward and upward opening movement of said doors toward their fully open positions. For this purpose each visor door may be provided with a single telescopically extensible strut device, incorporating a gas spring or a coil spring, which tends to cause the strut to extend, and when the door is lowered the strut contracts, this loading the spring. The main bin door may be provided with two such spring strut devices. Such spring strut devices are connected by hinges and other linkages to operate between the door and a fixed structure of the bin and each spring strut and its associated linkage occupies space within the bin. As a result in the region of each bin opening, while each door is acted upon by at least one spring strut device to assist opening of the door and each spring strut device acts upon only one door, because there are at least three doors provided at each bin opening, it has been necessary to provide a large number of spring strut devices, together with associated linkages, all located in the interior of each bin and all occupying valuable space in the bin interior.

The good utilization of available space and the saving of weight are desirable objectives in all technology and this is particularly so in the case of the engineering of an aircraft cabin. The present invention has as its object to satisfy this general objective by employing but a single spring strut with associated linkage means to act simultaneously upon two doors in such manner that the said two doors can be opened and closed one after the other.

According to one preferred aspect of the present invention, in a closure assembly for an overhead aircraft luggage bin including at least two doors, there is provided the combination comprising a single resilient strut device mounted on said bin and operable to bias the movement of two of said doors simultaneously between closed and open positions, differential means interconnecting said two doors and said resilient strut to permit simultaneous and limited relative movement of said respective doors, and latching means to selectively secure each of said respective doors in the closed position.

According to another aspect of this invention, there is provided an overhead luggage bin for the passenger cabin of an aircraft, the bin having an opening and there being at least two hinged doors provided at the bin opening, and wherein said luggage bin includes at least one telescopically extensible spring strut device, in which device a spring is resiliently loaded as the strut telescopically contracts, and wherein a said spring strut device operates on two of said doors simultaneously through the medium of a differential mechanism; the thrust of the spring strut device tending to open said two doors simultaneously and the differential mechanism permitting the two doors to be opened and closed, one relative to the other.

Preferably, the said differential mechanism comprises three lever arms carried pivotal about a first axis on a common axle carried by a fixed body structure of the luggage bin, the middle lever arm carrying a pinion for rotation thereon about a second axis, the said first and second axes being normal to one another. In such preferred arrangement the outer lever arms each mount an arcuate rack, the two racks being in parallel and facing one another and the pinion wheel being sandwiched between, and in toothed engagement with the two facing arcuate racks. The spring strut device is connected to the arm carrying the pinion, and the outer lever arms which mount the two arcuate racks being respectively linked to the said two doors, with the thrust of the spring strut device being transmitted to the two doors by way of the pinion and the two arcuate racks.

By this arrangement, if one door is opened or closed relative to the other door, such opening or closing movement is accompanied by pivotal movement of the two racks, one relative to the other and by rotation of the pinion; but both doors remain subjected to the thrust of the spring strut at all times, and thus both doors are simultaneously biassed to open. However, available space is well utilized because a single spring strut device acts on two doors simultaneously. These two doors may be two visor doors located side by side, or they may be a main door of a bin and behind this, one of the visor doors.

In a bin having one main door and behind this, two visor doors extending side by side over the bin opening, the three doors will be biassed to open by two spring struts in all, with each spring strut operating on the main door and one of the visor doors simultaneously. In order to achieve this simultaneous, or twin effect, each spring strut operates on two doors, whether located side by side or more preferably, one behind the other, through the medium of a differential mechanism which is an important preferred feature of the present invention.

The invention will be further described by way of example with reference to the accompanying drawings in which FIGS. 1 to 4 are schematic diagrams, all being side views of a double door hinge mechanism which is spring assisted.

In these drawings:

FIGS. 2 and 3 show the condition where one door is open, the other remaining closed.

A practical embodiment of apparatus provided according to the invention, shown by way of example in FIGS. 4 to 8. In these drawings:

FIG. 5 is a part sectional side view of the apparatus.

FIG. 6 is a plan view of the apparatus taken in the direction of the arrow VI of FIG. 5.

Figure 7:
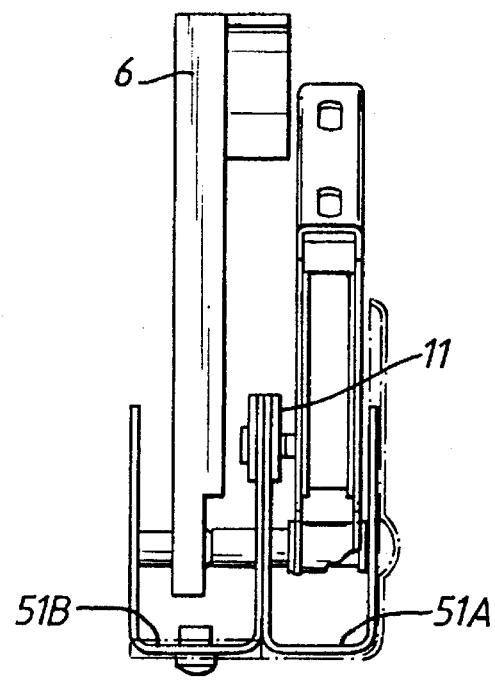

FIG. 7 is a front end view in cross-section taken on the line indicated at VII—VII in FIG. 5.

Figure 8:
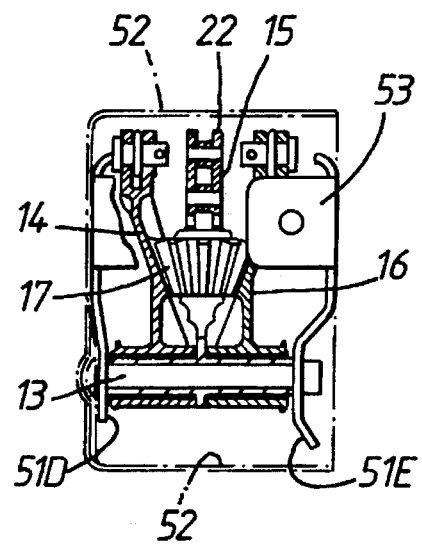

FIG. 8 is a rear end view in cross-section taken on the line indicated at VIII—VIII in FIG. 5.

Referring to the drawings, 1 represents a luggage bin having a side wall 2 and a roof panel 3. The side wall 2 and the roof panel 3 form part of the structure of the bin 1 which will be fixed at or above shoulder height in the passenger cabin of an aircraft. Such a bin 1 will have a frontal opening closed by a main door behind which there will be disposed two or more supplementary, preferably transparent, hinged visor doors, provided for the purpose mentioned at the outset of this specification and more fully discussed in the Specification of U.S. Pat. No. 5,035,471.

As shown in the drawings, the bin has a main outer door 4, and behind this an inner visor door 5. As will be seen from FIG. 1, the main outer door 4 is carried on a hinge bracket 6 which is hinged at 7 relative to the fixed bin structure. As will be seen from FIG. 2, the inner visor door 5 is carried on a bracket 8 which is hinged at 9. The hinges at 7 and 9 may be axially aligned; and indeed the two doors may be hinged on a common axle pin. The hinges 7 and 9 are carried fixed relative to the structure of the bin 1. The doors 4 and 5 swing outwardly and upwardly to open. Each door will be provided with latch means (not shown) to secure the respective door in the closed condition.

10 generally represents a telescopically extensible spring strut. This is a telescopic strut device which tends to extend under the influence of an internal spring (not shown). This may be a coil spring or a gas spring. The spring is resiliently loaded when the strut device telescopically contracts. Such struts are well known. The strut 10 is pivotally connected at 11 to an anchorage 12 which is fixed relative to the structure of the bin 1. Also carried fixed relative to the structure of the bin 1 is an axle shaft 13. In practical arrangements the hinges 7 and 9, the pivot at 11 and the axle 13 are preferably all carried on a common structurally strong metal frame which in turn is secured to the structure of the bin 1.

Three lever arms 14, 15, and 16 are pivotal on the axle shaft 13. The two outer lever arms 14 and 16 carry arcuate racks 18 and 20. The racks 18 and 20 are in parallel and face one another. The middle lever arm 15 rotatably mounts a pinion 17. The pinion 17 is sandwiched between and in toothed engagement with the arcuate racks 18 and 20. The racks 18 and 20 may be constituted as toothed quadrants. The pinion 17 rotates on an axis which is always at right angles to the axis of the axle shaft 13.

The spring strut 10 is pivotally connected at 22 to the middle lever lever 15. A rod 23 connects the lever arm 16 to a hinge pivot 6A on an arm 6B of the bracket 6. A rod 24 connects the lever arm 14 to a hinge pivot 8A on an arm 8B of the bracket 8.

Figure 1:
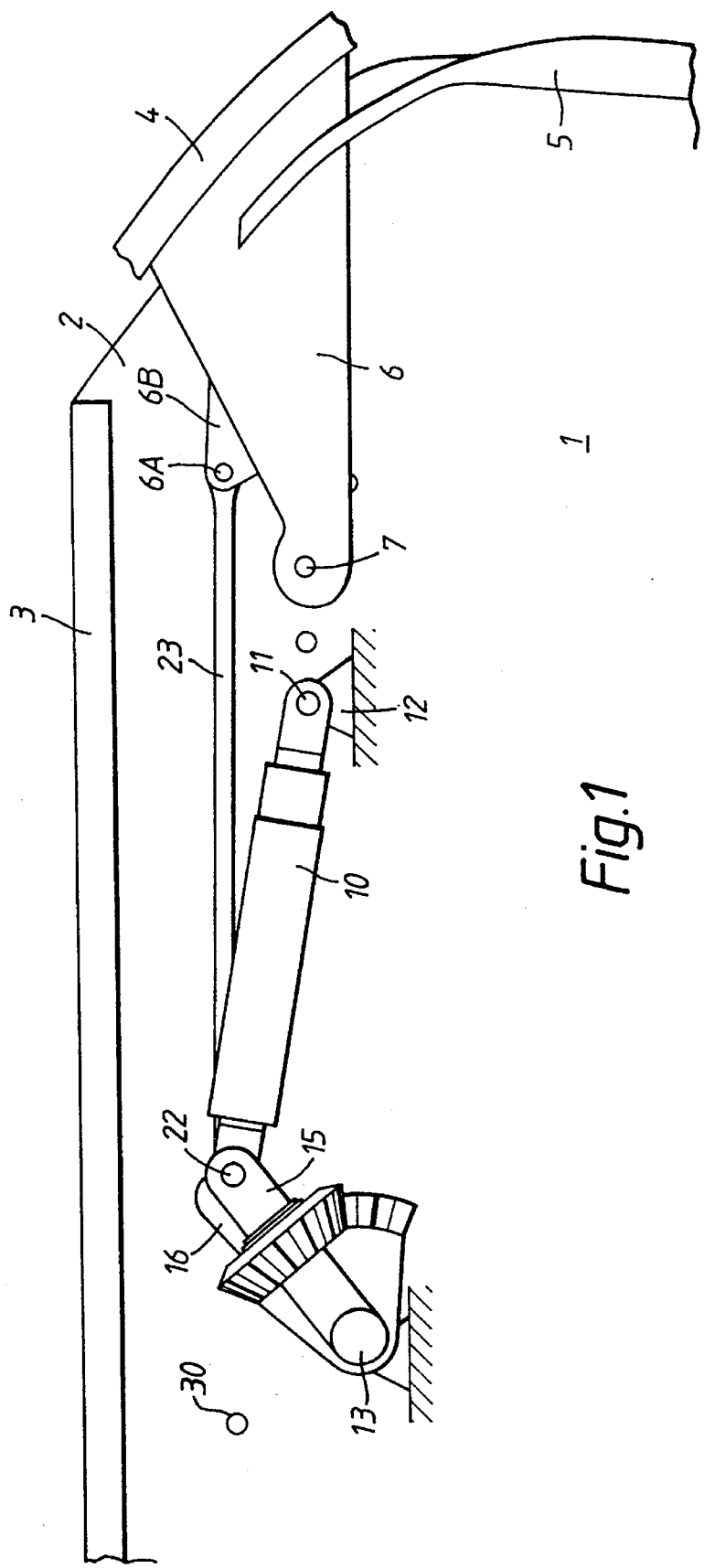

The thrust of the spring strut 10 on the middle lever arm 15 is transmitted by the pinion 17 to both racks 18 and 20 and thence by way of the rods 23 and 24 to the hinge pivots 6A and 8A on the arms 6B and 8B of the brackets 6 and 8 of the two doors 4 and 5. This tends to open both doors 4 and 5 from the position when both doors are closed as shown in FIG. 1. On opening, the doors 4 and 5 swing outwardly and upwardly.

Figure 2:
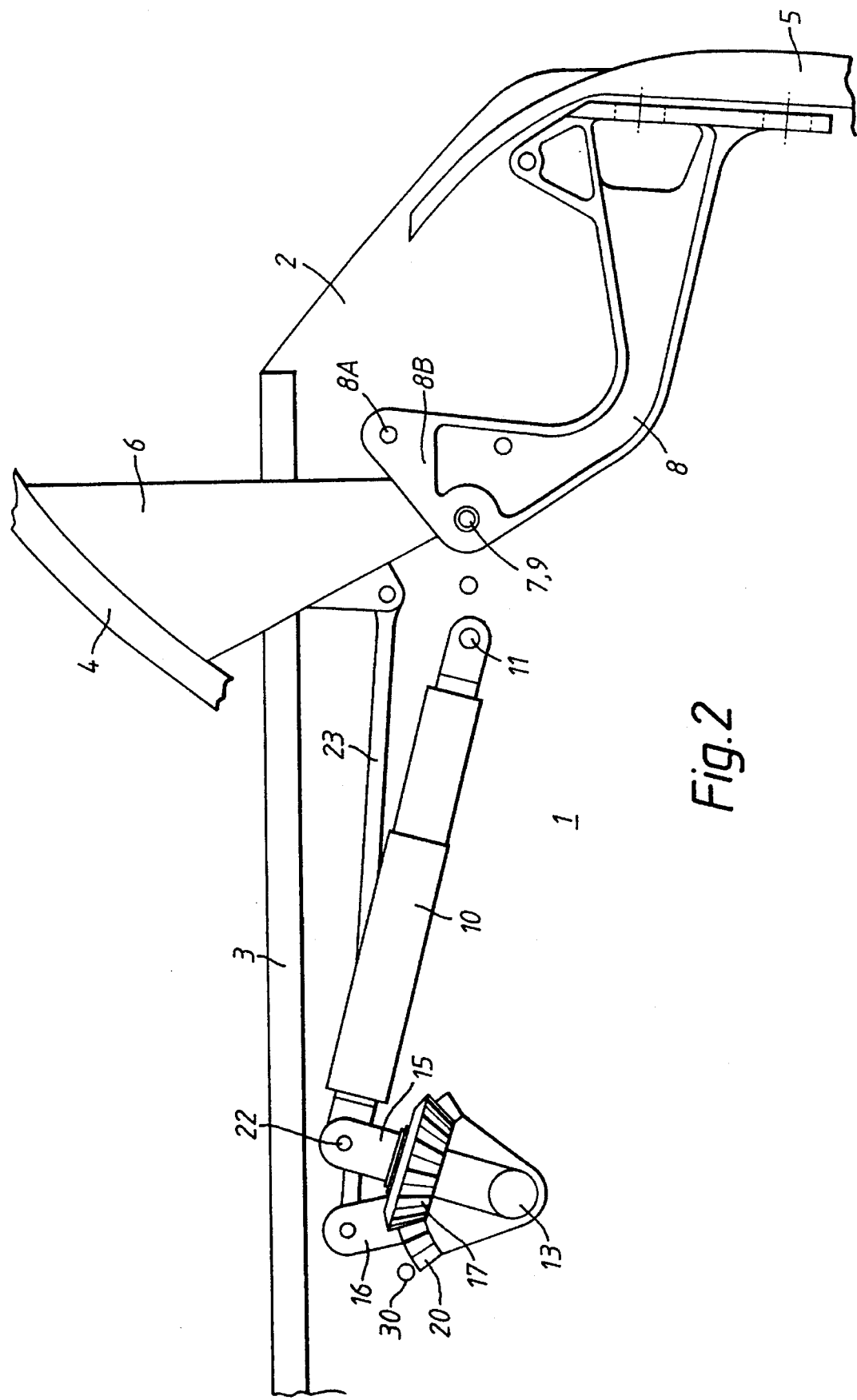
FIG. 2 shows the condition when both doors are closed.
Figure 3:
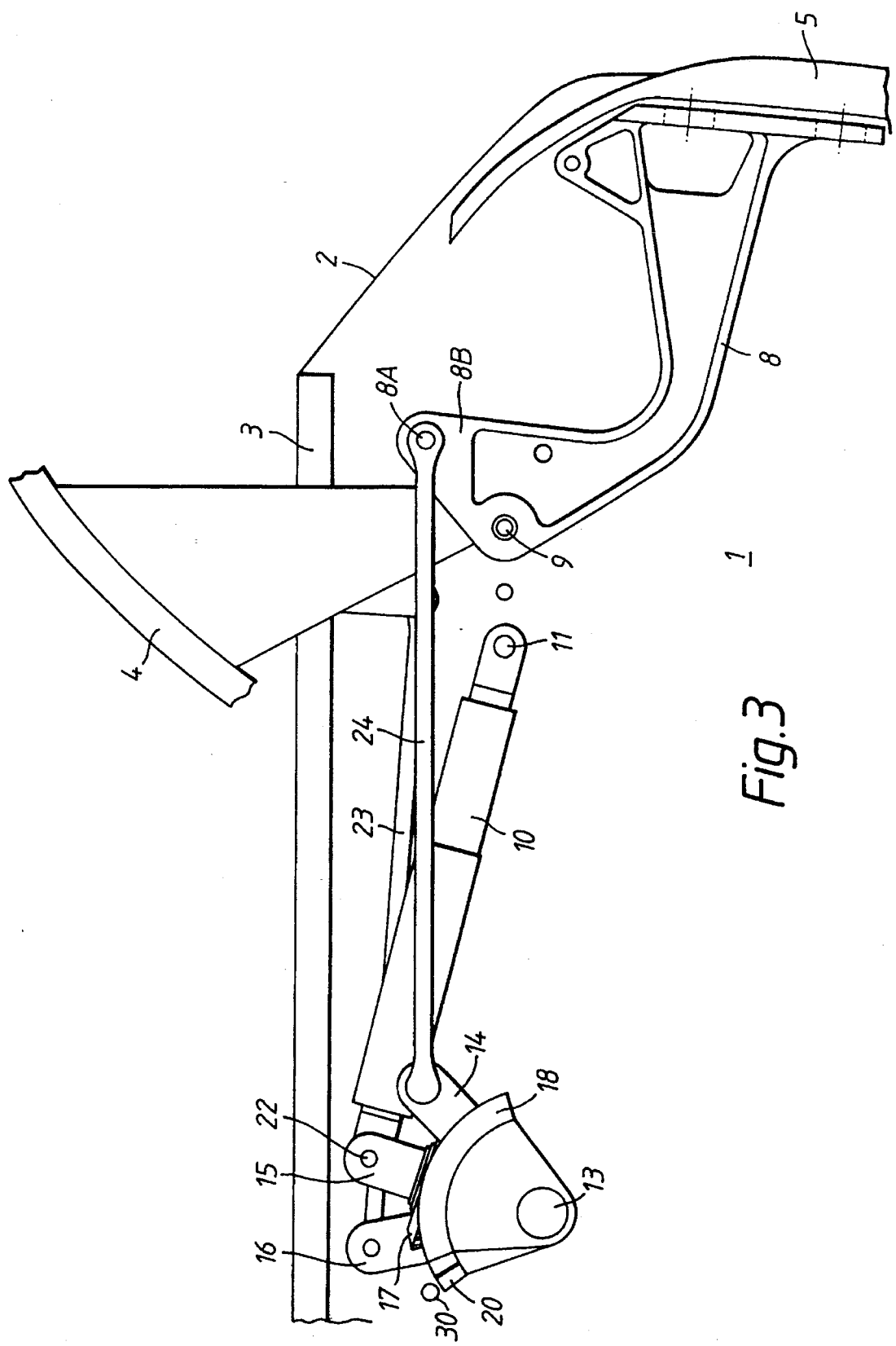
Figure 4:
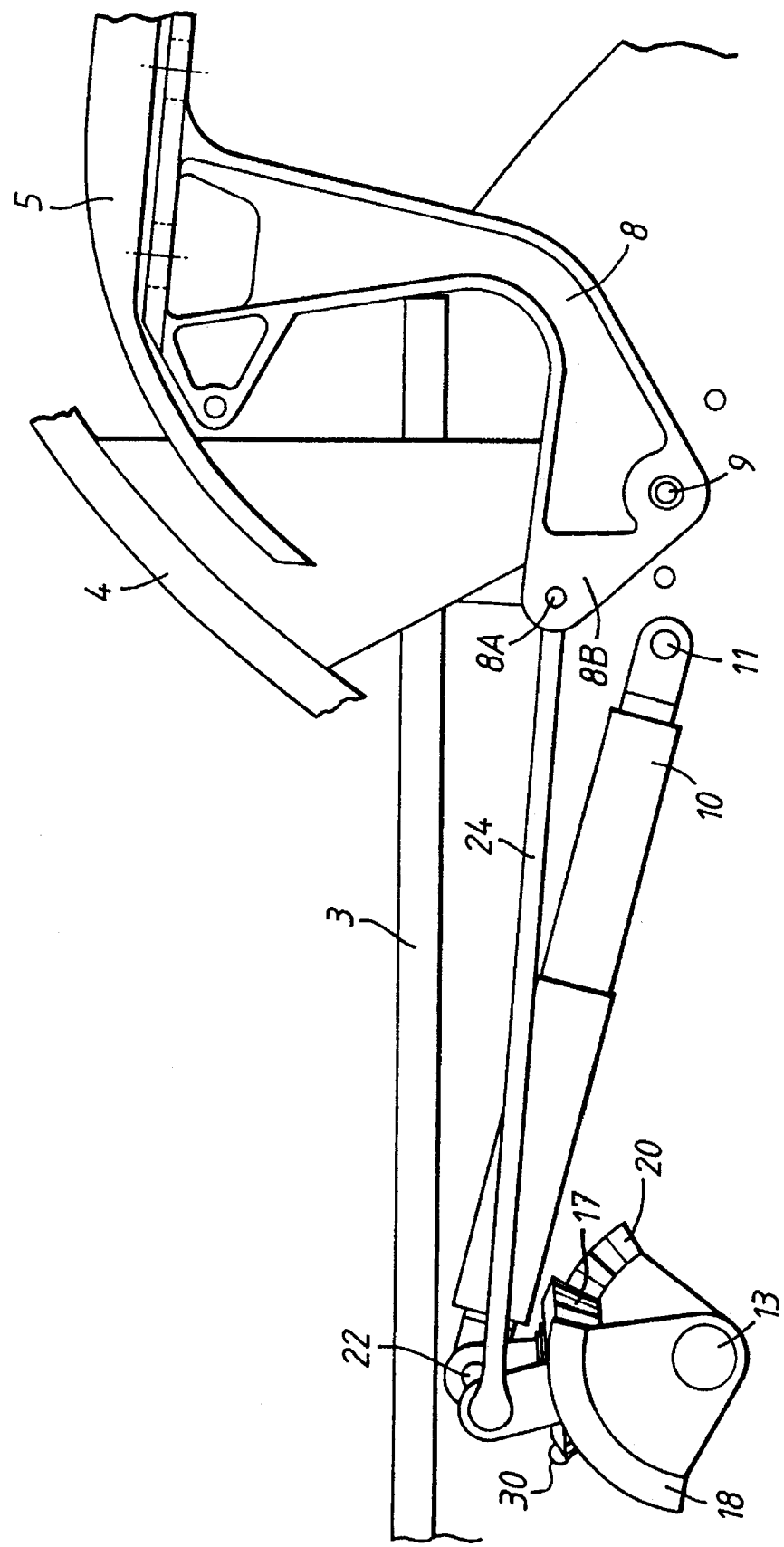
FIG. 4 shows the position where both doors are open.

When the door 4 is opened, with the door 5 remaining closed, as is shown schematically in FIGS. 2 and 3, the rack 20 rotates relative to the rack 18, with the pinion 17 rolling between the racks. When the door 5 then opens as shown in FIG. 4, the rack 18 then rotates to follow the rack 20, this again being permitted by the pinion rolling along rack 20. A stop 30 may be provided for limiting the pivotal movement, in the anti-clockwise direction in the drawings, FIGS. 1 to 4, of the lever arms 14 and 16.

As has been described and illustrated the differential device constituted by the pinion 17 and the two racks 18 and 20 is employed to transmit thrust from the telescopically extensible spring strut device 10 to two doors 4 and 5 arranged one behind the other. However the device could alternatively be used to transmit spring thrust to two doors arranged side by side. As one spring can be employed to bias two doors simultaneously there is gained a saving in weight and economy in the utilization of space.

Both of the doors acted upon by the device 10 are biassed by the apparatus above described towards the condition where both doors are open. And when each door is closed by lowering the door, the device 10 is elastically loaded. The two doors will each be provided with latch means (not shown) for securing the doors in the closed condition. Such latch means will be of known type and will be self-latching on closure of the doors, so that each door can be slammed shut without any need for manual intervention at its latch means. But in order for the door to be opened, it will be necessary for the user to employ his hand deliberately to manipulate the latch means in order to effect unlocking of the door whereupon it can be opened by swinging outwardly and upwardly.

In the practical embodiment of the invention illustrated in FIGS. 5 to 8, like numerals are employed for those components which are similar to components of FIGS. 1 to 4. In all respects the device shown in FIGS. 5 to 8 operates in the manner shown and described with reference to the schematic diagrams of FIGS. 1 to 4.

The device illustrated in FIGS. 5 to 8 is intended to be used on the left hand side of a bin (viewing towards the bin through its opening) and in this, the main door bracket 6 is to be left of the visor bracket 8 as is seen in FIG. 7. When the device is sited on the opposite side of the luggage bin 1 the brackets 6 and 8 will be oppositely disposed with the bracket 6 on the right of the bracket 8. During its pivotal movement, as the main door (not shown in FIGS. 5 to 8) opens, its bracket 6 moves in a slot or gap alongside the adjacent visor door, one of which (again not shown) will be carried on the bracket 8 of FIGS. 5 to 8.

The brackets 6 and 8 are carried on aligned hinges 7 and 9. These hinges 7 and 9 are in turn carried on a metal structurally strong frame generally designated 51. The frame 51 also mounts the axle shaft 13 which carries the lever arms 14, 15 and 16 and the stop 30 which latter is constructed as a cross brace for the frame 51. As will best be seen in FIG. 7 the frame 51 is formed at a front end to form two troughs 51A and 51B arranged side by side. At its other end and as shown in FIG. 8, the frame is constructed as two plates 51D and 51E.

In the particular arrangement shown by way of example, the frame 51 will be bolted to a side wall of the luggage bin, and, by means of a bracket 53, to a rear wall of the bin. The frame 51 is structurally strong enough to maintain the hinges 7 and 9, the axle 13 and the pivot at 11 in fixed space relationship, notwithstanding the forces exerted by the spring device 10 which always biasses the doors towards their open conditions. Partly for cosmetic reasons, but mainly in order to exclude foreign bodies, the frame 51 is provided with a non-structural shroud member, shown in dotted lines and generally designated 52 in FIG. 5.

I claim:

1. In a closure assembly for an overhead aircraft luggage bin including at least two doors, the combination comprising a single resilient strut device mounted on said bin and operable to bias the movement of two of said doors simultaneously between closed and open positions, differential means interconnecting said two doors and said resilient strut to permit simultaneous and limited relative movement of said respective doors, and latching means to selectively secure each of said respective doors in the closed position.

2. The invention defined in claim 1 wherein said differential means includes a pinion gear operably connected to said resilient strut, and rack gear means connected to said pinion and said doors to bias said doors toward the open position.

3. The invention defined by claim 2 wherein said rack gear means includes at least one arcuate rack gear segment interconnecting said pinion gear and at least one of said doors.

4. The invention defined by claim 1 wherein all doors are mounted to swing about a common axis.

5. The invention defined by claim 3 wherein each rack gear segments are mounted to swing about a common axis.

6. The invention defined by claim 3 wherein said pinion gear is rotatably mounted on an arm to swing about an axis common to said axis of said rack gear segments.

7. An overhead luggage bin for the passenger cabin of an aircraft, the bin having an opening and there being at least two hinged doors provided at the bin opening, and wherein said luggage bin includes at least one telescopically extensible spring strut device, in which device a spring is resiliently loaded as the strut telescopically contracts, and wherein a said spring strut device operates on two of said doors simultaneously through the medium of a differential mechanism;

the thrust of the spring strut device tending to open said two doors simultaneously and the differential mechanism permitting the two doors to be opened and closed, one relative to the other.

8. A luggage bin as defined in claim 7, and wherein said differential mechanism comprises three lever arms carried pivotal about a first axis on a common axle fixedly mounted on said bin, one of said arms carrying a pinion for rotation thereon about a second axis, the said first and second axes being normal to one another;

and wherein the other lever arms each mount an arcuate rack, said racks being in parallel and facing one another and the pinion wheel, and in toothed engagement therewith;

said spring strut device being connected to the arm carrying the pinion, and the outer lever arms which mount the two arcuate racks being respectively linked to each of the two doors, with the thrust of the spring strut device being transmitted to the two doors by way of the pinion and the two arcuate racks.

9. A luggage bin according to claim 8 and wherein the spring strut device operates simultaneously on a main door of the bin and on a supplementary visor door located behind said main door.

10. A luggage bin as defined in claim 7 and including latching means to selectively secure each of said respective doors in the closed position.

* * * * *